US012754197B2

(12) United States Patent
Chen et al.

(10) Patent No.: US 12,754,197 B2
(45) Date of Patent: Oct. 6, 2026

(54) FULLY AUTOMATIC DEVICE USED FOR EXTRACTING BLOOD SAMPLES FROM CARDS

(71) Applicant: SHANGHAI UNIVERSITY OF SPORT, Shanghai (CN)

(72) Inventors: Peijie Chen, Shanghai (CN); Yuhong Wang, Shanghai (CN); Jing Jing, Shanghai (CN); Xin Xu, Shanghai (CN); Xiaojun Deng, Shanghai (CN)

(73) Assignee: SHANGHAI UNIVERSITY OF SPORT, Shanghai (CN)

( * ) Notice: Subject to any disclaimer, the term of this patent is extended or adjusted under 35 U.S.C. 154(b) by 49 days.

(21) Appl. No.: 18/987,409

(22) Filed: Dec. 19, 2024

(65) Prior Publication Data

US 2026/0072051 A1 Mar. 12, 2026

Related U.S. Application Data

(63) Continuation of application No. PCT/CN2024/120340, filed on Sep. 23, 2024.

(30) Foreign Application Priority Data

Sep. 6, 2024 (CN) ......................... 202411246678.8

(51) Int. Cl.
*G01N 1/34* (2006.01)
*G01N 35/00* (2006.01)
(Continued)

(52) U.S. Cl.
CPC ....... *G01N 35/10* (2013.01); *G01N 35/00029* (2013.01); *G01N 1/28* (2013.01); *G01N 2035/00356* (2013.01)

(58) Field of Classification Search
None
See application file for complete search history.

(56) References Cited

U.S. PATENT DOCUMENTS 9,546,935 B1 * 1/2017 Astle ...................... G01N 1/312
2007/0148046 A1 * 6/2007 Nakaya .................... G01N 1/31 422/82.05

(Continued)

FOREIGN PATENT DOCUMENTS

CN 107255728 A * 10/2017 ............. G01N 35/10
CN 114324943 A 4/2022

(Continued)

*Primary Examiner* — Maris R Kessel
*Assistant Examiner* — Madison T. Herbert

(57) ABSTRACT

The present disclosure discloses a fully automatic device used for extracting blood samples from cards that includes an analysis module and a grab module; an outlet is set on the bottom of the grab module, an inlet communicating with the outlet is set on the top of the analysis module, the grab module includes an upper case, material boxes arranged inside the upper case, and a grabbing mechanism; the analysis module includes a lower case, a holder arranged inside the lower case, a test card conveying mechanism arranged on the holder, a detection mechanism, and an elution mechanism; the elution mechanism includes a first tightly-fitting head and a second tightly-fitting head that are arranged one in front of another; a first flow passage is set inside the first tightly-fitting head, and a first cavity communicating with the first flow passage is formed at a rear-end of the first flow passage.

9 Claims, 12 Drawing Sheets

(51) Int. Cl.

| | |
|---|---|
| ***G01N 35/10*** | (2006.01) |
| *G01N 1/28* | (2006.01) |

(56) References Cited

U.S. PATENT DOCUMENTS

| | | | | |
|---|---|---|---|---|
| 2011/0129863 | A1* | 6/2011 | Shoemaker | B01L 3/5025 435/287.1 |
| 2011/0129940 | A1* | 6/2011 | Gijlers | B01L 3/505 436/178 |
| 2013/0239665 | A1* | 9/2013 | Loppacher | G01N 35/10 73/61.59 |
| 2014/0092382 | A1* | 4/2014 | Hayama | G01N 35/00029 356/244 |
| 2020/0376410 | A1* | 12/2020 | Choi | B01L 3/502753 |
| 2021/0285977 | A1 | 9/2021 | Tu et al. | |

FOREIGN PATENT DOCUMENTS

| | | | | |
|---|---|---|---|---|
| CN | 115128178 | A * | 9/2022 | G01N 30/14 |
| CN | 217359244 | U | 9/2022 | |
| CN | 115372603 | A | 11/2022 | |
| CN | 220926729 | U | 5/2024 | |
| WO | 2023025333 | A1 | 3/2023 | |

* cited by examiner

FULLY AUTOMATIC DEVICE USED FOR EXTRACTING BLOOD SAMPLES FROM CARDS

CROSS-REFERENCE TO RELATED APPLICATIONS

This application is a bypass continuation application of PCT application no.: PCT/CN2019/097583. This application claims priorities from PCT Application PCT/CN2019/097583, filed Jul. 24, 2019, and from Chinese patent application 202411246678.8, filed Sep. 6, 2024, the contents of which are incorporated herein in the entirety by reference.

TECHNICAL FIELD

The present disclosure relates to the technical field of experimental instruments, in particular to a fully automatic device used for extracting blood samples from cards.

BACKGROUND OF THE DISCLOSURE

As for Dried Blood Spot (DBS) serving as a mature and advanced method used for collecting and preserving blood, it is possible to achieve storing and transporting blood at room temperature just by the way of collecting blood droplets onto a filter paper card from a fingertip or a heel then drying them at room temperature for more than 2 hours to fulfil sample preparation. In recent years, the DBS technology has overcome the problems such as high blood storage requirements and easy conversion of components and got enhanced in stability of compounds in biological samples, making it possible to store and transport blood samples at room temperature for a long time. As a good alternative to a method of collecting liquid blood samples, DBS has been widely used in clinical fields such as clinical disease marker detection, drug monitoring, and pharmacokinetic studies, as well as in the fields of metabolomics, dope screening, and forensic tests. When the DBS detection is performed on existing test devices, it is necessary to firstly punch off blood sample spots on a test paper card, secondly add a solvent to extract the sample, thirdly make a liquid sample through operation such as mixing and centrifugation, and then separate and analyze it by means of liquid chromatography mass spectrometry. This process is cumbersome, costly and time-consuming.

SUMMARY

The objective of the present disclosure consists in making it possible to easily and quickly elute blood samples on the test card online and save detection costs by the way of providing a fully automatic device used for extracting blood samples from cards.

The following technical solution can make the objective of the present disclosure achievable.

A fully automatic device used for extracting blood samples from cards includes an analysis module and a grab module set on the analysis module; an outlet is set on the bottom of the grab module, an inlet communicating with the outlet is set on the top of the analysis module, and a test card passage is formed between the outlet and the inlet; the grab module includes an upper case, a plurality of material boxes used to store a plurality of test cards that are arranged at an inner bottom of the upper case, and a grabbing mechanism used to grab a test card; the analysis module includes a lower case, a holder arranged inside the lower case, a test card conveying mechanism arranged on the holder, a detection mechanism used to detect a position of a blood sample on a test card, an elution mechanism used to elute a blood sample on a test card with blood samples that has arrived, and a drying system used to dry an test card that has been eluted; the elution mechanism includes a first tightly-fitting head and a second tightly-fitting head that are arranged one in front of another, a gap through which a test card can pass is set between the first tightly-fitting head and the second tightly-fitting head, a tightly-fitting head driving motor that drives the second tightly-fitting head to move toward the first tightly-fitting head is arranged behind the second tightly-fitting head; a first flow passage is set inside the first tightly-fitting head, and a first cavity communicating with the first flow passage is formed at a rear-end of the first flow passage, a second flow passage is set inside the second tightly-fitting head, and a second cavity communicating with the second flow passage is formed at a front-end of the second flow passage; the first flow passage, the first cavity, the second flow passage and the second cavity are all coaxially arranged, and the openings of the two cavities are same in size, and an elution cavity is formed when the two cavities are close together.

In the case of employing the above-mentioned technical solution during operation, a test card with blood samples is conveyed to the gap between the first tightly-fitting head and the second tightly-fitting head, then one elution chamber is formed when the two cavities are close together, in this way a blood sample on the test card just lies inside the elution chamber. Subsequently, an eluent flows in from the second flow passage, flows through the elution cavity, and flows out from the first flow passage, so as to avoid necessity in the prior art to punch off dried blood sample spots on a test paper card for dissolution, centrifugation and other steps to make a liquid sample and then carry out a next analysis step, thereby speeding up the test process.

In the specific embodiments of the present disclosure: the volume of the first cavity is greater than the volume of the second cavity, the first cavity is conical in shape, and the second cavity is flat in shape. In the case of employing this structure, since the second cavity is flat in shape and its volume is small, it is possible to quickly fill the second cavity with an eluent, so that the eluent can be fully in contact with the blood sample on the test card; the design that the first cavity is conical in shape and has a larger volume enables a pressure difference to form between itself and the second cavity, facilitating the penetration of the eluent, meanwhile enhancing the fluidity of the fluid passing through the test card, so as to make it easier for the blood sample to detach from the test card.

In the specific embodiments of the present disclosure: the device further includes a heating element installed inside the lower case, the drying system, the heating element, the first tightly-fitting head and the second tightly-fitting head are connected with one another by means of an identical control pipeline, and a circulation valve used to control switching is further connected on the control pipeline.

In the specific embodiments of the present disclosure: an electric rotary table is arranged at an inner bottom of the upper case, the plurality of material boxes are distributed on the electric rotary table at equal intervals, and the grabbing mechanism includes a clamping jaw, a jaw lift assembly that drives the clamping jaw to move upward and downward, a jaw longitudinally-moving assembly that drives the clamping jaw to longitudinally move, and a jaw transversely-moving assembly that drives the clamping jaw to transversely move.

In the specific embodiments of the present disclosure: the test card conveying mechanism includes a clamp positioned below the inlet, a clamp translating assembly that drives the clamp to transversely translate and a clamp lift assembly that drives the clamp to move upward and downward.

In the specific embodiments of the present disclosure: the clamp lift assembly includes a U-shaped frame the middle of which is hinged on the holder and a driving motor positioned at the rear of the U-shaped frame and used to drive a tail of the U-shaped frame to move upward and downward.

In the specific embodiments of the present disclosure: the clamp translating assembly includes a support seat fixed on a front end of the U-shaped frame, a motor fixed on the support seat, and two belt pulleys that are fixed at both ends of the support seat, and around which a belt is twisted, one of the belt pulleys is connected with the motor by means of a rotating shaft, the clamp is fixedly connected with the belt, a plurality of guide wheels are arranged on the support seat, the belt is winded though all the guide wheels in turn, the clamp is positioned at a front end of the U-shaped frame and fixedly connected with the belt, a transverse guide rail is fixed before the belt on the support seat, a transverse sliding piece is slidingly connected on the transverse guide rail, and the clamp is fixed on the transverse sliding piece.

In the specific embodiments of the present disclosure: the elution mechanism further includes an elution support, the first tightly-fitting head is installed on the elution support by means of a first connector, and the second tightly-fitting head is installed on the elution support by means of a second connector.

In the specific embodiments of the present disclosure: the first connector includes a first fixing piece and a first clamping piece, the first fixing piece is fixed on a bottom surface of the elution support, a transverse dead groove is set on a bottom surface of the first fixing piece, the first clamping piece is installed inside the dead groove, a first clamping hole is set on the first clamping piece, and the first tightly-fitting head is installed inside the first clamping hole.

In the specific embodiments of the present disclosure: the second connector includes a second fixing piece and a second clamping piece, the second fixing piece is fixed on a bottom surface of the elution support and positioned behind the first fixing piece, a longitudinal sliding groove is set on a bottom surface of the second fixing piece, the second clamping piece is slidably arranged inside the sliding groove, a second clamping hole is set on the second clamping piece, and the second tightly-fitting head is installed inside the second clamping hole.

To sum up, in the present disclosure, the first flow passage is set inside the first tightly-fitting head, and the first cavity communicating with the first flow passage is formed at a rear-end of the first flow passage, the second flow passage is set inside the second tightly-fitting head, and the second cavity communicating with the second flow passage is formed at a front-end of the second flow passage, and an elution cavity is formed when the two cavities are close together. When a blood sample on the test card just lies inside the elution chamber, an eluent flows in from the second flow passage, flows through the elution cavity, and flows out from the first flow passage, so as to enable the blood sample to quickly detach from the test card, thereby speeding up the elution process and achieving simplicity in structure and cost saving.

BRIEF DESCRIPTION OF THE DRAWINGS

We shall further describe the present disclosure in combination with the figures as follows.

DETAILED DESCRIPTION OF SOME EMBODIMENTS

We shall clearly and completely describe the technical solutions in the embodiments of the present disclosure in combination with the drawings in the examples of the present disclosure as follows, and it is obvious that the described examples are only part of the embodiments of the present disclosure, not all embodiments. Based on the examples in the present disclosure, all other examples obtained by a person skilled in the art on the premise of not having made creative work fall into the protection scope of the present disclosure.

Figure 1:
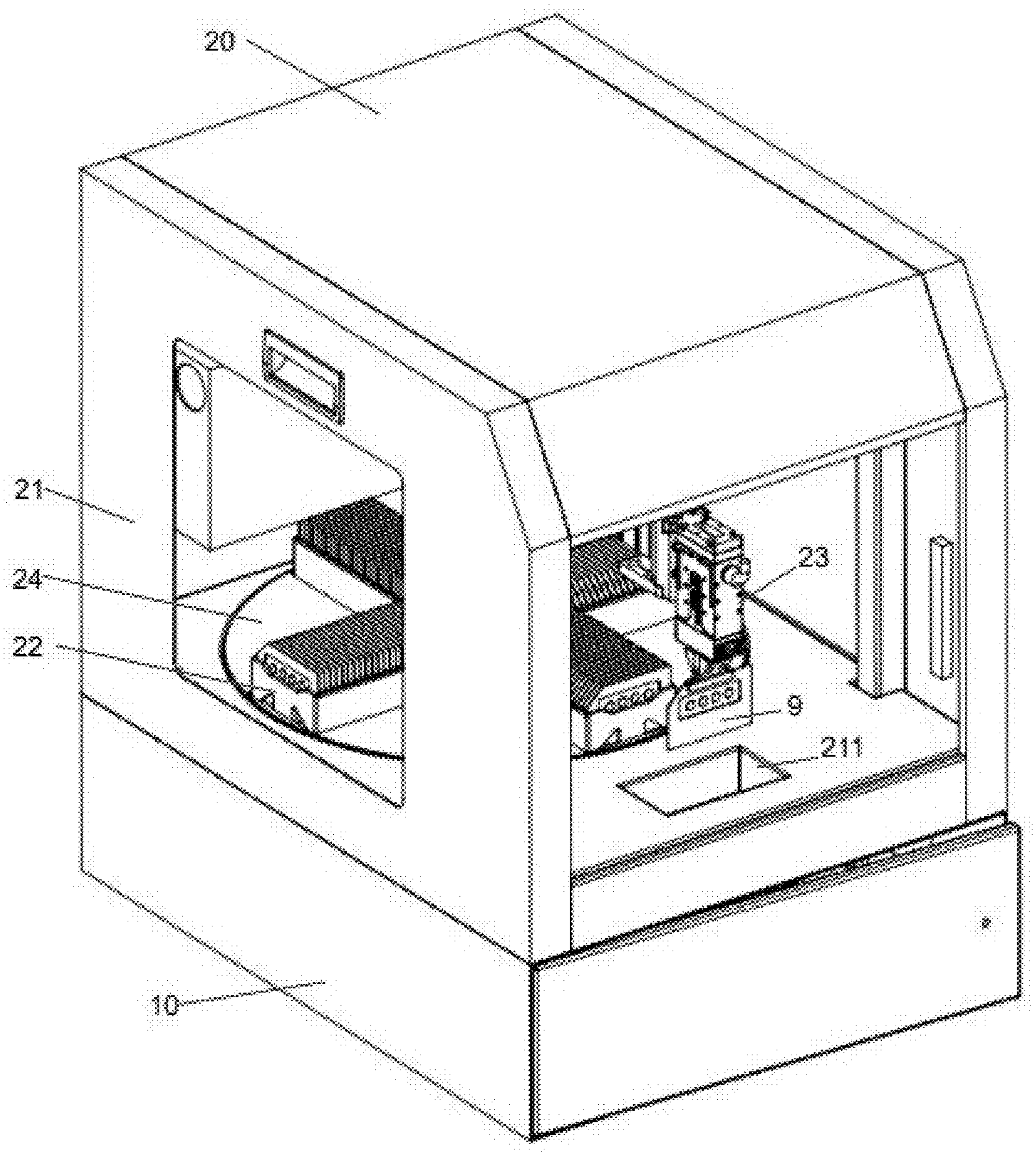
FIG. 1 is a structural schematic diagram of the fully automatic device used for extracting blood samples from cards according to the present disclosure.

Referring to FIG. 1, the fully automatic device used for extracting blood samples from cards according to the present disclosure includes an analysis module 10 and a grab module 20 detachably set on the analysis module 10.

Figure 2:
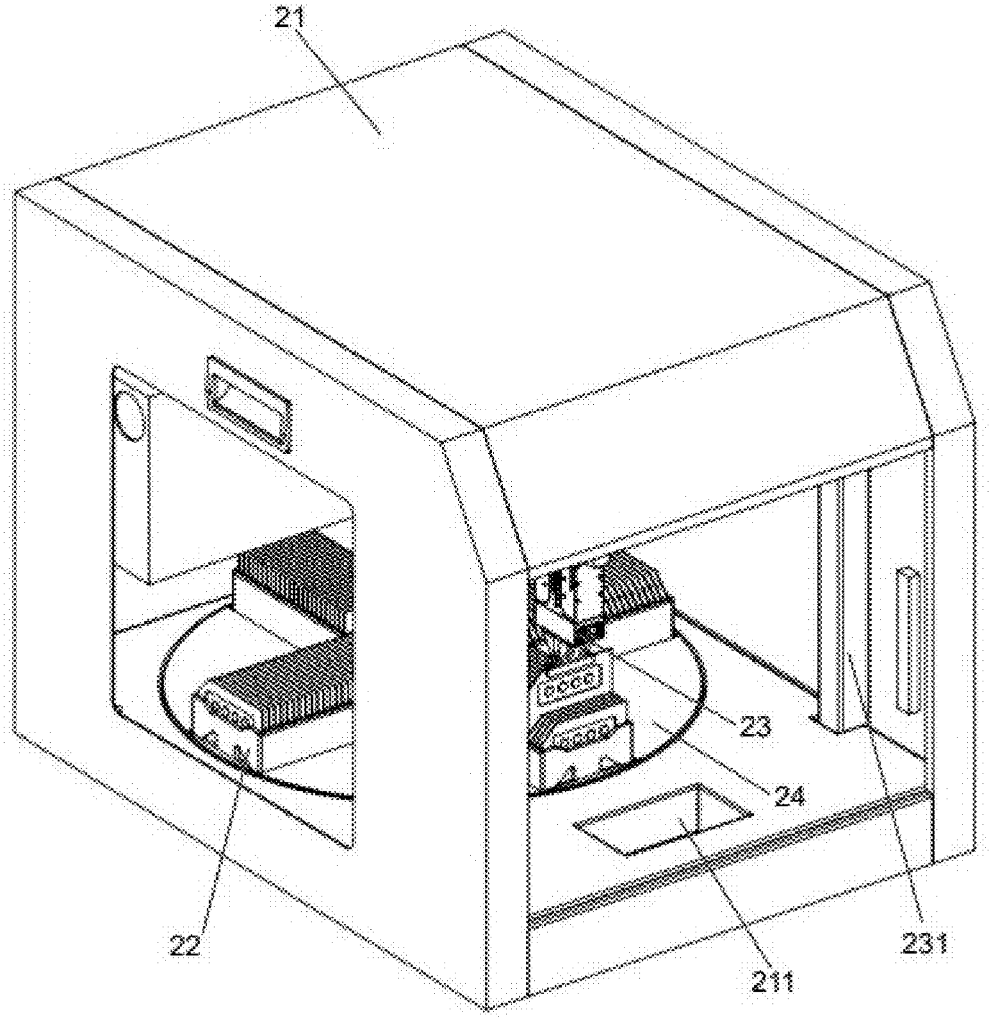
FIG. 2 is a structural schematic diagram of the analysis module according to the present disclosure.
Figure 12:
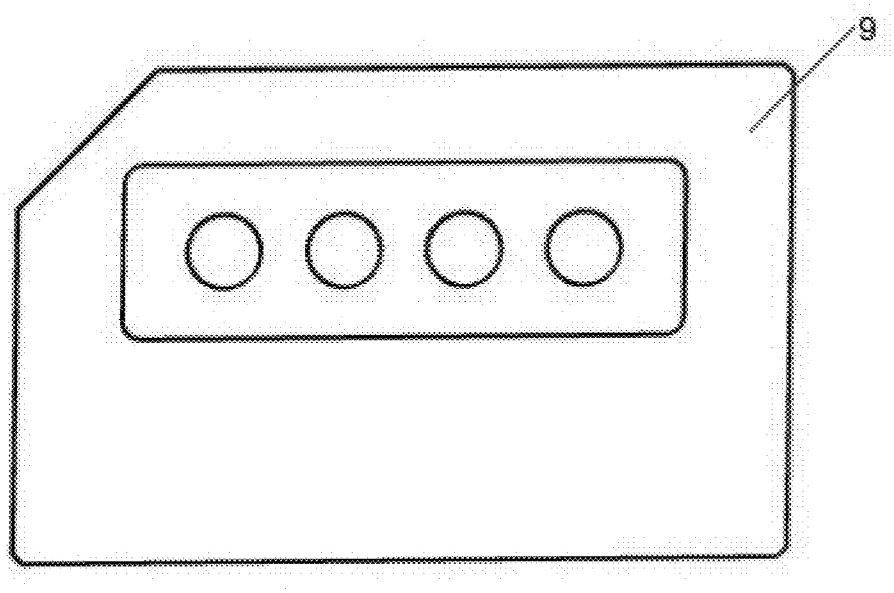
FIG. 12 is a structural schematic diagram of the test card according to the present disclosure.

As jointly shown in FIG. 2, the grab module 20 includes an upper case 21, a plurality of material boxes 22 used to store the test card 9 as shown in FIG. 12, and a grabbing mechanism 23 used to grab the test card 9.

An electric rotary table 24 is arranged at the bottom of the upper case 21, and the plurality of material boxes 22 are distributed on the electric rotary table 24 at equal intervals, in this example, the material boxes 22 are four in number. An outlet 211 is set at the bottom of the upper case 21 and positioned before the electric rotary table 24. A plurality of isolation grooves are arranged at equal intervals in each material box 22, and a plurality of test cards 9 are respectively inserted in a corresponding isolation groove. In the case of employing the above-mentioned technical solution, when all the test cards with blood samples in this current material box have been eluted, the electric rotary table 24 rotates to revolve a next material box 22 to lie below the grabbing mechanism 23, so as to execute an elution operation again.

Figure 3:
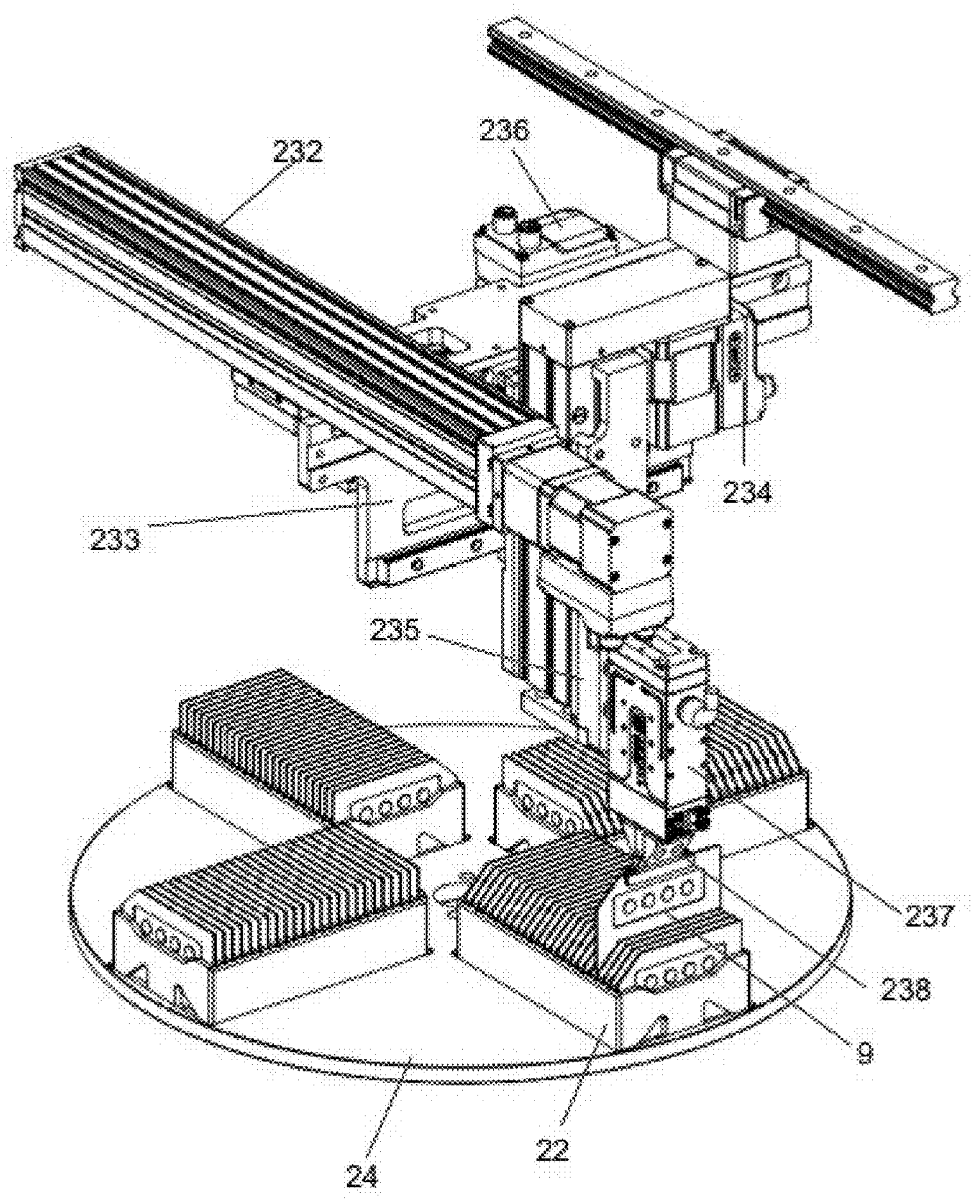
FIG. 3 is a structural schematic diagram of the grabbing mechanism according to the present disclosure.

As jointly shown in FIG. 3, the grabbing mechanism 23 includes a clamping jaw support 231 fixed inside the upper case 21, a jaw longitudinally-moving assembly 232 fixed on the clamping jaw support 231, a horizontally-sliding seat 233 installed on an output end of the jaw longitudinally-moving assembly 232, a jaw transversely-moving assembly 236 fixed on the horizontally-sliding seat 233, a jaw lift assembly 234 installed on an output end of the jaw transversely-moving assembly 236, a up-and-down sliding seat 235 installed on an out end of the jaw lift assembly 234, and a clamping jaw 238 installed on the up-and-down sliding seat 235 and driven by a jaw-adapted air cylinder 237.

In this example, the jaw lift assembly 234, the jaw longitudinally-moving assembly 232 and the jaw transversely-moving assembly 236 all employ a linearly-sliding unit driven by a servo motor.

Figure 4:
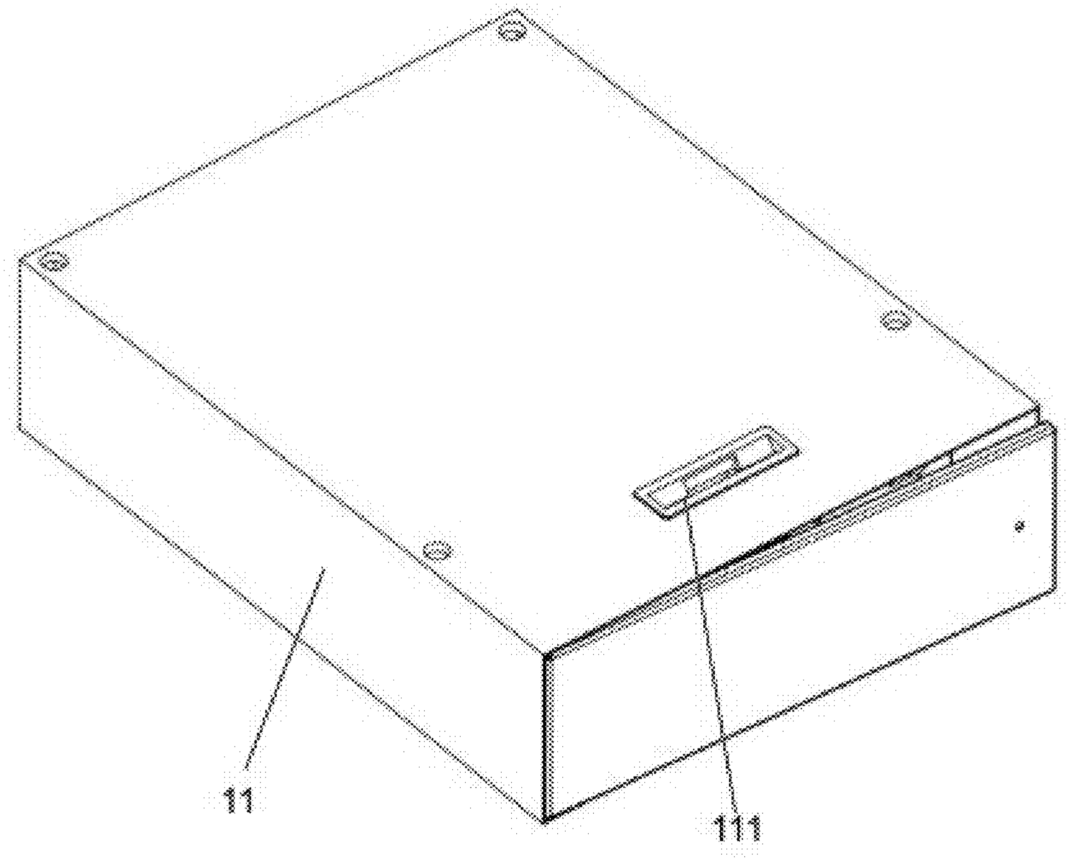
FIG. 4 is a structural schematic diagram of the upper case according to the present disclosure.
Figure 5:
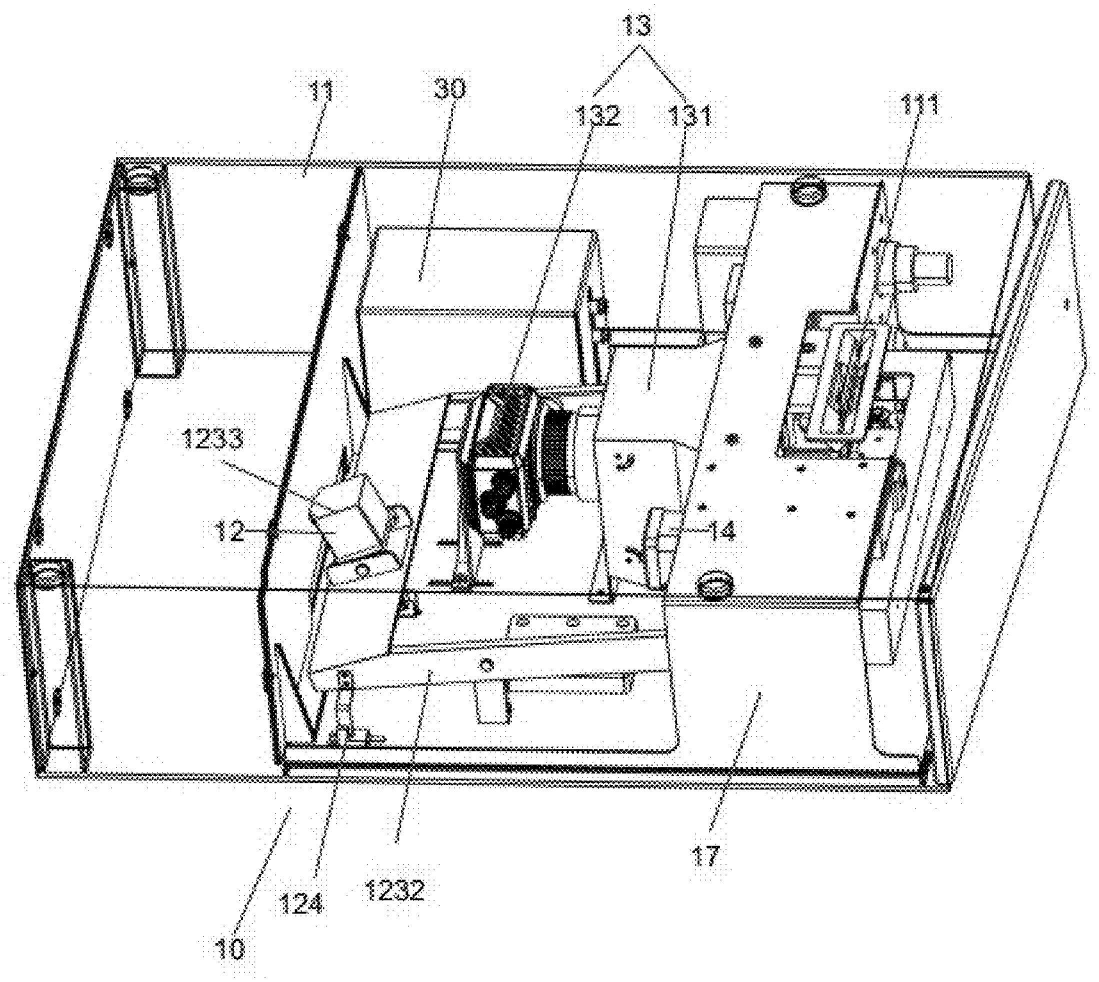
FIG. 5 is a structural schematic diagram of the analysis module according to the present disclosure.

As shown in FIGS. 4-5, the analysis module 10 includes a lower case 11, a holder 17 arranged at the bottom of the lower case 11, a test card conveying mechanism 12 arranged on the holder 17, a detection mechanism 13 used to detect a position of a blood sample on a test card 9, and an elution mechanism 14 used to elute a blood sample on a test card 9 with blood samples that has arrived.

In the analysis module 10, an inlet 111 communicating with the outlet 211 is set on the top of the lower case, and a test card passage is formed between the outlet 211 and the inlet 111.

Figure 6:
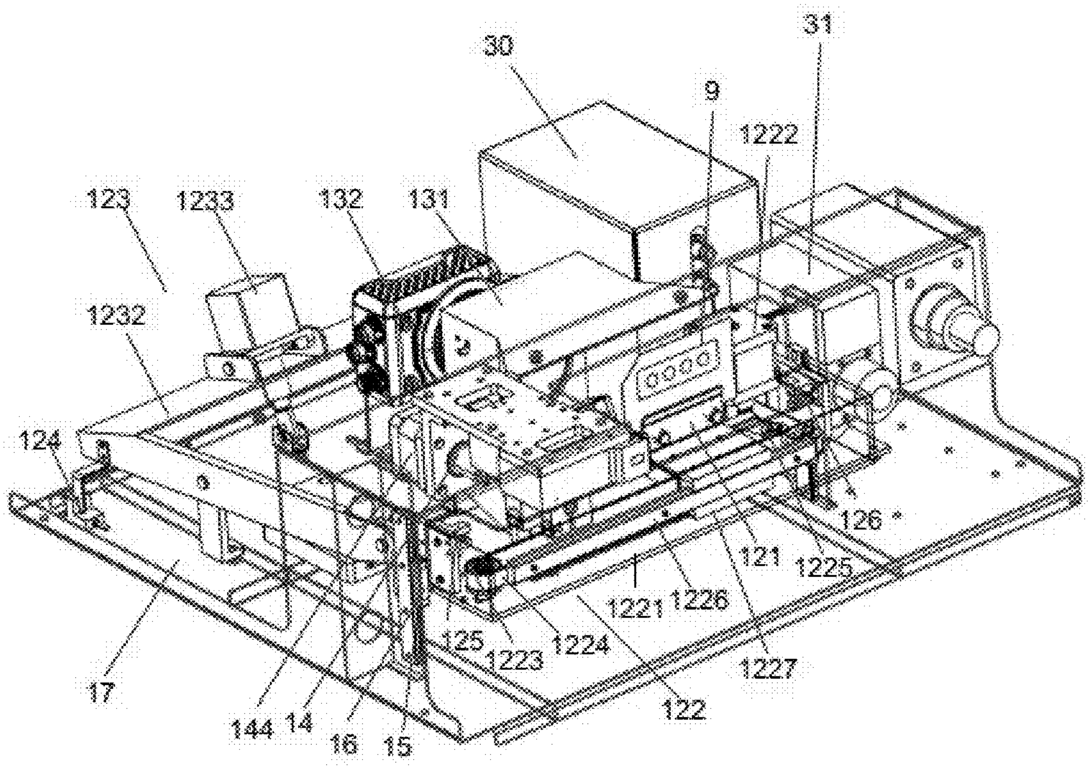
FIG. 6 is a structural schematic diagram of the test card conveying mechanism according to the present disclosure.

As jointly shown in FIG. 6, the test card conveying mechanism 12 includes a clamp 121 positioned below the inlet 111, a clamp translating assembly 122 that drives the clamp 121 to transversely translate and a clamp lift assembly 123 that drives the clamp 121 to move upward and downward. This clamp 121 is used to catch a test card 9 conveyed out by the clamping jaw 238.

The clamp lift assembly 123 includes a U-shaped frame 1232 the middle of which is hinged on the holder 17 and a driving motor 1233 positioned at the rear of the U-shaped frame 1232 and used to drive a tail of the U-shaped frame 1232 to move upward and downward.

The clamp translating assembly 122 includes a support seat 1221 fixed on a front end of the U-shaped frame 1232, a transverse motor 1222 fixed on the support seat 1221, and two belt pulleys 1223 that are fixed at both ends of the support seat 1221, and around which a belt 1224 is twisted, one of the belt pulleys 1223 is connected with the transverse motor 1222 by means of a rotating shaft. A plurality of guide wheels 1225 are arranged on the support seat 1221, the belt 1224 is winded though all the guide wheels 1225 in turn. The clamp 121 is positioned at the front end of the U-shaped frame 1232 and fixedly connected with the belt 1224. A transverse guide rail 1226 is fixed before the belt 1224 and positioned above the support seat 1221, a transverse sliding piece 1227 is slidingly connected on the transverse guide rail 1226, and the clamp 121 is fixed on the transverse sliding piece 1227. The clamp 121 has a first stop position and a second stop position when it is driven to transversely move. When the clamp 121 is positioned directly below the inlet 111, it lies at the first stop position, and when the clamp 121 is positioned at the elution mechanism, it lies at the second stop position.

In addition, vertical guide rails 15 are arranged at the bottom of the holder 17 and positioned on both sides of the support seat 1221 respectively, and a vertical sliding piece 16 is slidably connected with the vertical guide rail 15. Both ends of the support seat 1221 are fixedly connected with a corresponding vertical sliding piece 16 respectively.

A first sensor 124 is disposed near the tail of the U-shaped frame 1232. A second sensor 125 and a third sensor 126 are respectively installed on an inner side surface of the left and right sides of the support seat 1221. All sensors are electrically connected to a controller (not shown in the figure). When the clamp 121 lies at the first stop position, the third sensor 126 detects the clamp 121 and transmits a signal to the controller, and the controller controls the driving motor 1233 to start, then the driving motor 1233 drives the tail of the U-shaped frame 1232 to descend. When the first sensor 124 detects the tail of the U-shaped frame 1232 (that is, the tail of the U-shaped frame 1232 lies at a low position, and the front end of the U-shaped frame 1232 ascends then lies at a high position), the driving motor 1233 stops, then the controller controls the clamping jaw 238 to descend and inserts the test card 9 into the clamp 121. Subsequently, the controller controls the driving motor 1233 to drive the tail of the U-shaped frame 1232 to ascend slightly, so that the front end of the U-shaped frame 1232 descends slightly, and drives the clamp 121 to descend slightly. After that, the transverse motor 1222 starts, and drives the clamp 121 to move to the second stop position, then the second sensor 125 detects the clamp 121 and transmits a signal to the controller, and the controller controls the transverse motor 1222 to stop, after that, into a next action.

The detection mechanism 13 incudes a camera light source 131 positioned behind the first stop position and a detection camera 132 positioned behind the camera light source 131. The detection camera 132 and the camera light source 131 are both electrically connected with the controller.

Figure 7:
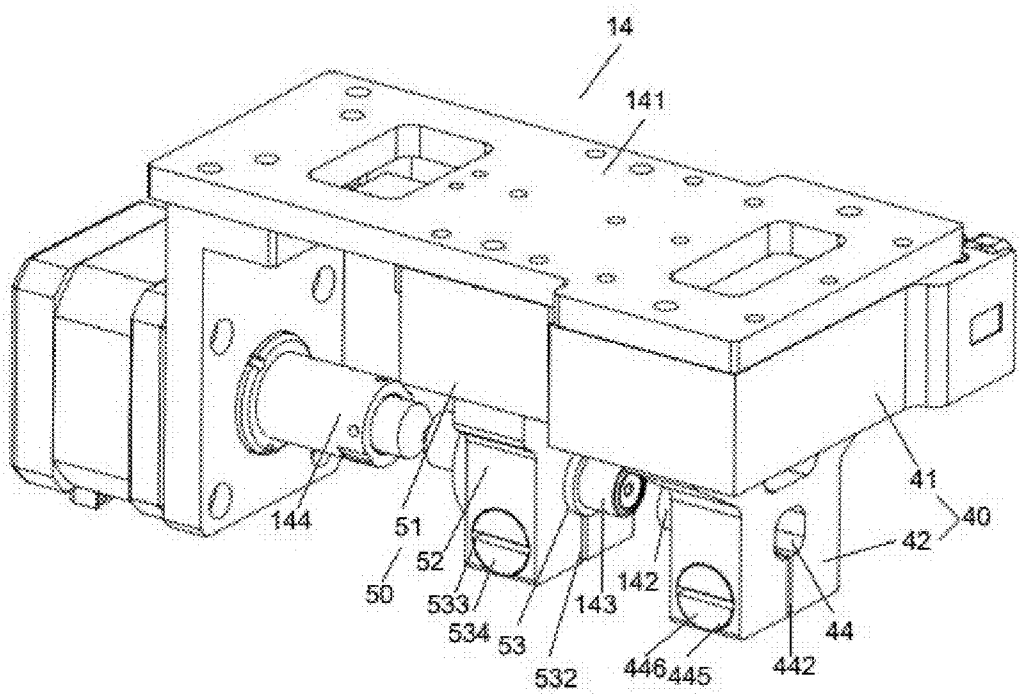
FIG. 7 is a structural schematic diagram of the elution mechanism according to the present disclosure.
Figure 8:
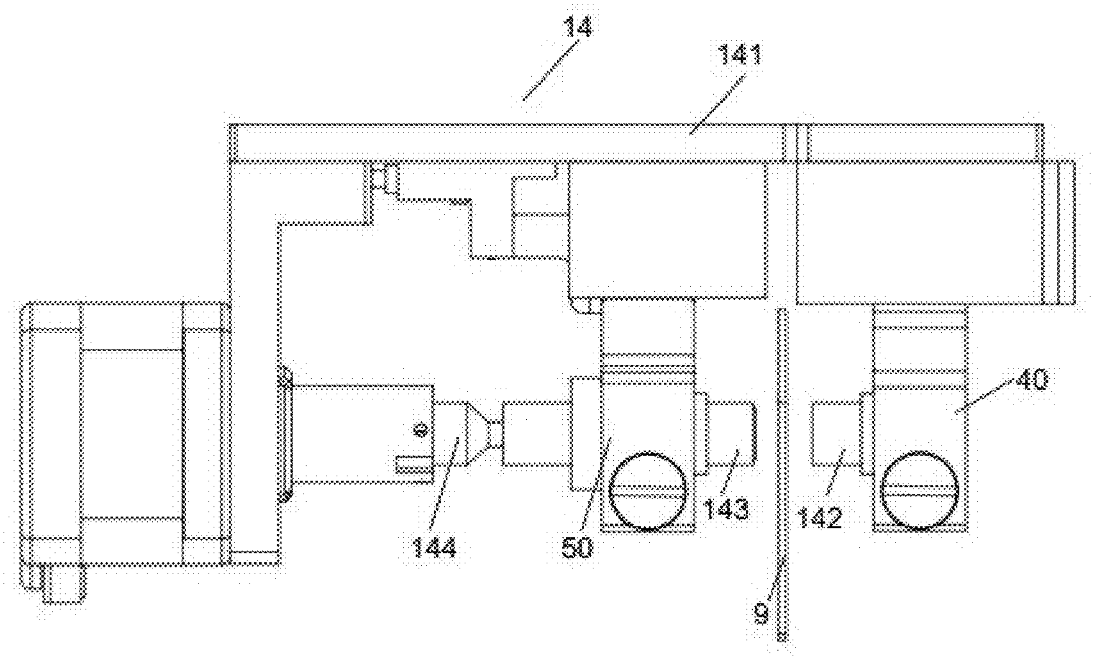
FIG. 8 shows that the test card is conveyed to the gap between the first tightly-fitting head and the second tightly-fitting head.

As jointly shown in FIGS. 7-8, the elution mechanism 14 further includes an elution support 141, and a first tightly-fitting head 142 and a second tightly-fitting head 143 that are arranged one in front of another and installed on the elution support 141, and a gap through which a test card 9 can pass is set between the first tightly-fitting head 142 and the second tightly-fitting head 143.

Figure 13:
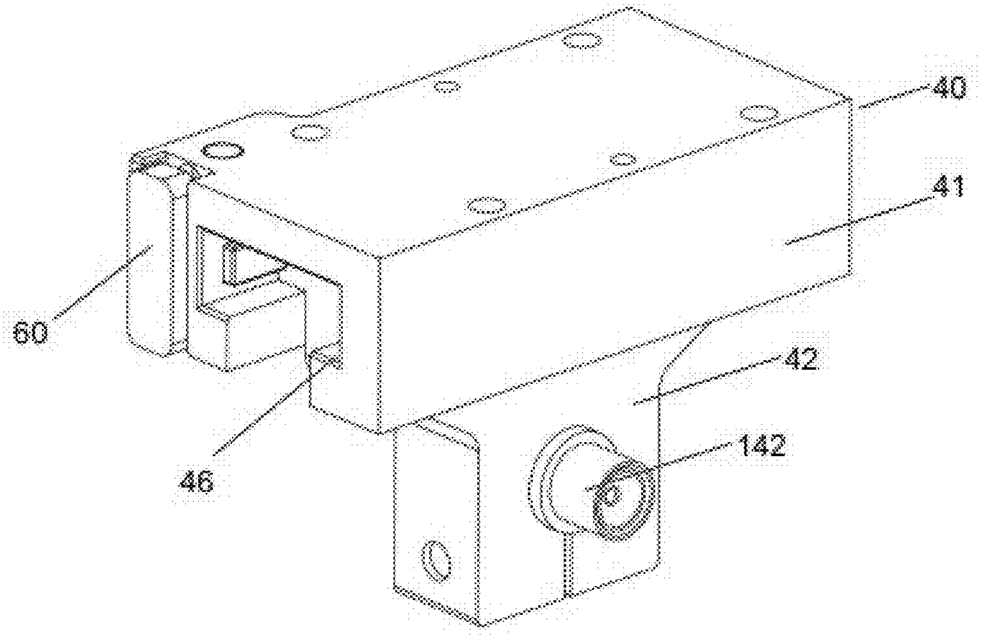
FIG. 13 is a structural schematic diagram of the first connector according to the present disclosure.
Figure 16:
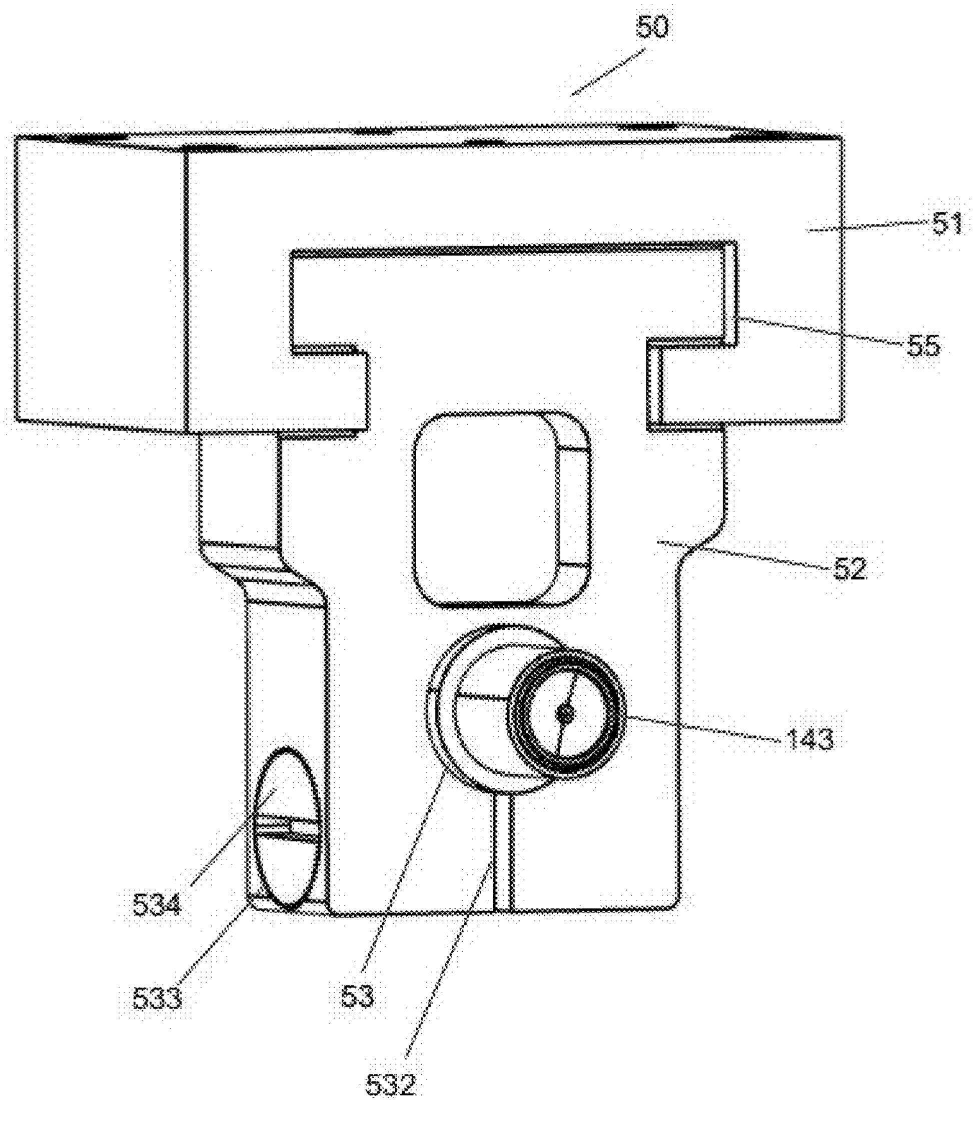
FIG. 16 is a structural schematic diagram of the second connector according to the present disclosure.

As shown in FIG. 7, FIG. 13 and FIG. 16, the first tightly-fitting head 142 is installed on the elution support 141 by means of a first connector 40, and the second tightly-fitting head 143 is installed on the elution support 141 by means of a second connector 50.

Figure 14:
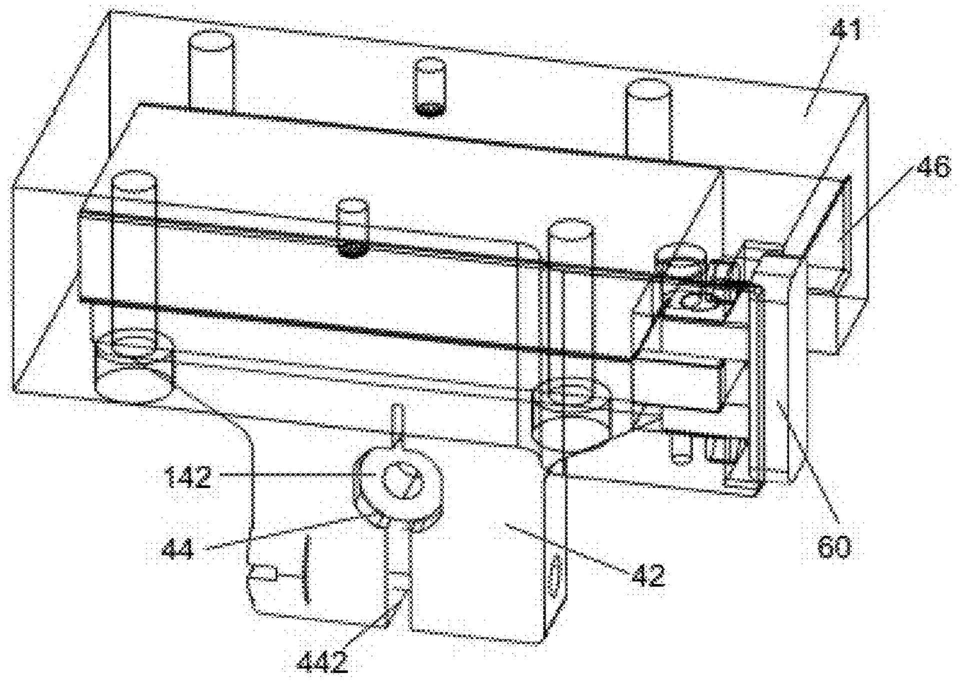
FIG. 14 is a structural schematic diagram of the quick-replacement mechanism according to the present disclosure.
Figure 15:
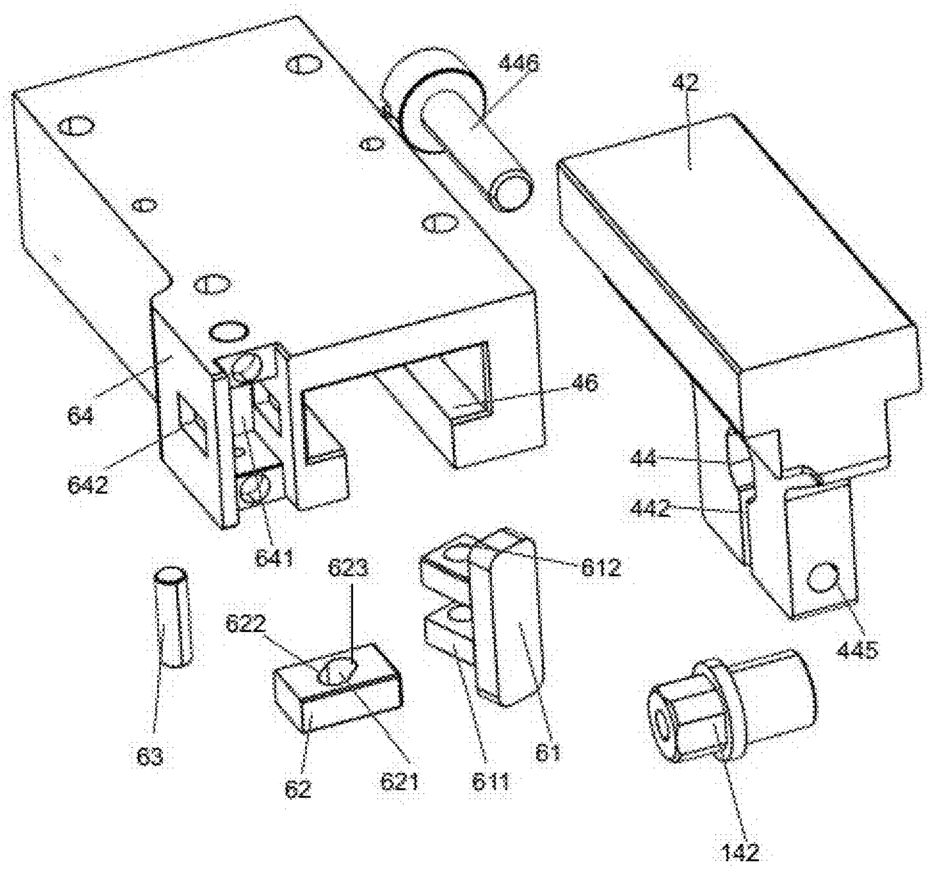
FIG. 15 is an exploded view of the first connector according to the present disclosure.

As shown in FIGS. 13-15, the first connector 40 includes a first fixing piece 41 and a first clamping piece 42, the first fixing piece 41 is fixed on a bottom surface of the elution support 141, a first clamping piece 42 is installed at a bottom surface of the first fixing piece 41, a transverse dead groove 46 is set on the bottom surface of the first fixing piece 41, the dead groove 46 has one open end and another closed end in structure. In this way, when the first clamping piece 42 is installed inside the dead groove 46, an inner end of the first clamping piece 42 is blocked by the closed end of the dead groove 46. A first clamping hole 44 is set at the middle of the first clamping piece 44, a first slot 442 communicating with the first clamping hole 44 is set below the first clamping hole 44, a first bolt hole 445 penetrating through the first slot 442 is set at a lower part of the first clamping piece 42, and a first locking bolt 446 is disposed inside the first bolt hole 445. At the time of assembling, insert the first tightly-fitting head 142 into the first clamping hole 44, then tighten the first locking bolt 446, so that the first tightly-fitting head 142 is locked and fixed.

As shown in FIGS. 14-15, a quick-replacement mechanism 60 used to conveniently replace the first clamping piece 42 is set at the open end of the dead groove 46.

This quick-replacement mechanism 60 includes a pressing bar 61, a blocking bar 62 and a pin 63. A one-piece mounting seat 64 is arranged on a front side of the first fixing piece 41 and close to the open end of the dead groove 46. The mounting seat 64 has a transverse groove 641 and a sliding hole 642 horizontally arranged and penetrating through the transverse groove 641. This sliding hole 642 communicates with the dead groove 46. The transverse groove 641 is a stepped groove and has a step at its bottom. The pressing bar 61 is inserted inside the transverse groove 641, and a gap is set between an inner end face of a horizontal portion 611 of the pressing bar 61 and a side wall surface opposite the opening of the transverse groove 641. A lower side horizontal portion 611 of the pressing bar 61 is in contact with the step. The blocking bar 62 is inserted in the sliding hole 642 and is positioned between the two horizontal portions 611 of the pressing bar 61. The blocking bar 62 has a waist-shaped hole 621. The waist-shaped hole 621 has a first position 622 and a second position 623. A pin hole 612 is symmetrically set on each of the two horizontal portions 611 of the pressing bar 61. This pin 63 is positioned inside the waist-shaped hole 621, after its upper and lower ends penetrate through a corresponding pin hole 612 respectively; the lower end is blocked by the step at the bottom of the transverse groove 641.

When the pin 63 is positioned at the first position of the waist-shaped hole 621, an inner side end of the blocking bar 62 stretches into the dead groove 46 to resist a tail end of the first clamping piece 42, and an outer side end of the blocking bar 62 is positioned inside the sliding hole 642; at the time of pressing down the pressing bar 61, the pressing bar 61 moves and forces the pin 63 to move from the first position 622 to the second position 623, the outer side end of the blocking bar 62 stretches outward from the sliding hole 642, the inner end of the blocking bar 62 retracts into the sliding hole 642, the inner end of the blocking bar 62 neither touches the first clamping piece 42 nor blocks the first clamping piece 42, so that the first clamping piece 42 can be detached from the open end of the dead groove 46. In the case of employing this structure, it is possible to not only conveniently and quickly detach the first tightly-fitting head 142, but also reserve a sufficient space at the time of replacing the second tightly-fitting head 143, making it easy to replace the second tightly-fitting head 143.

As shown in FIG. 7 and FIG. 16, the second connector 50 includes a second fixing piece 51 and a second clamping piece 52, the second fixing piece 51 is fixed on a bottom surface of the elution support 141, a longitudinal sliding groove 55 is set on a bottom surface of the second fixing piece 51, the second clamping piece 52 is slidably arranged inside the sliding groove 55, a second clamping hole 53 is set at the middle of the second clamping piece 52, a second slot 532 is set below the second clamping hole 53 and communicates with it. A second bolt hole 533 penetrating through the second slot 532 is set at a lower part of the second clamping block 52, and a second locking bolt 534 is disposed in the second bolt hole 533. At the time of assembling, install the second tightly-fitting head 143 inside the second clamping hole 53, then tighten the second locking bolt 534, so that the second tightly-fitting head 143 is locked and fixed.

A tightly-fitting head driving motor 144 that drives the second tightly-fitting head 143 to move toward the first tightly-fitting head 142 is fixed on the elution support 141.

Figure 9:
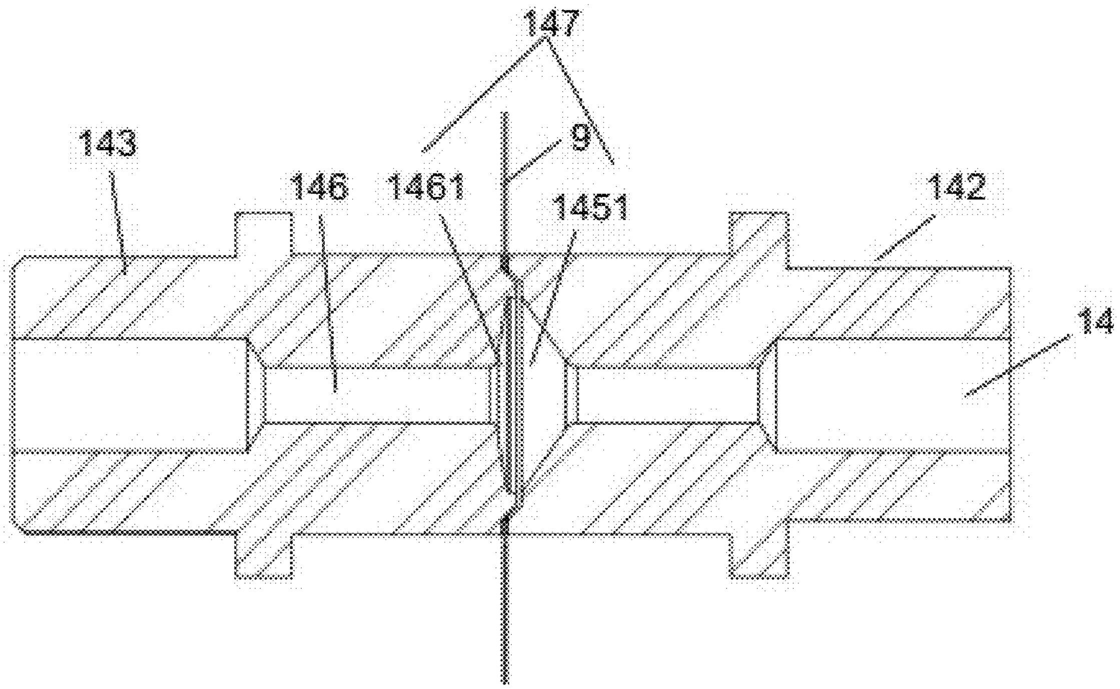
FIG. 9 shows that an elution cavity is formed when the two cavities are close together and a blood sample on the test card just lies inside the elution chamber.
Figure 10:
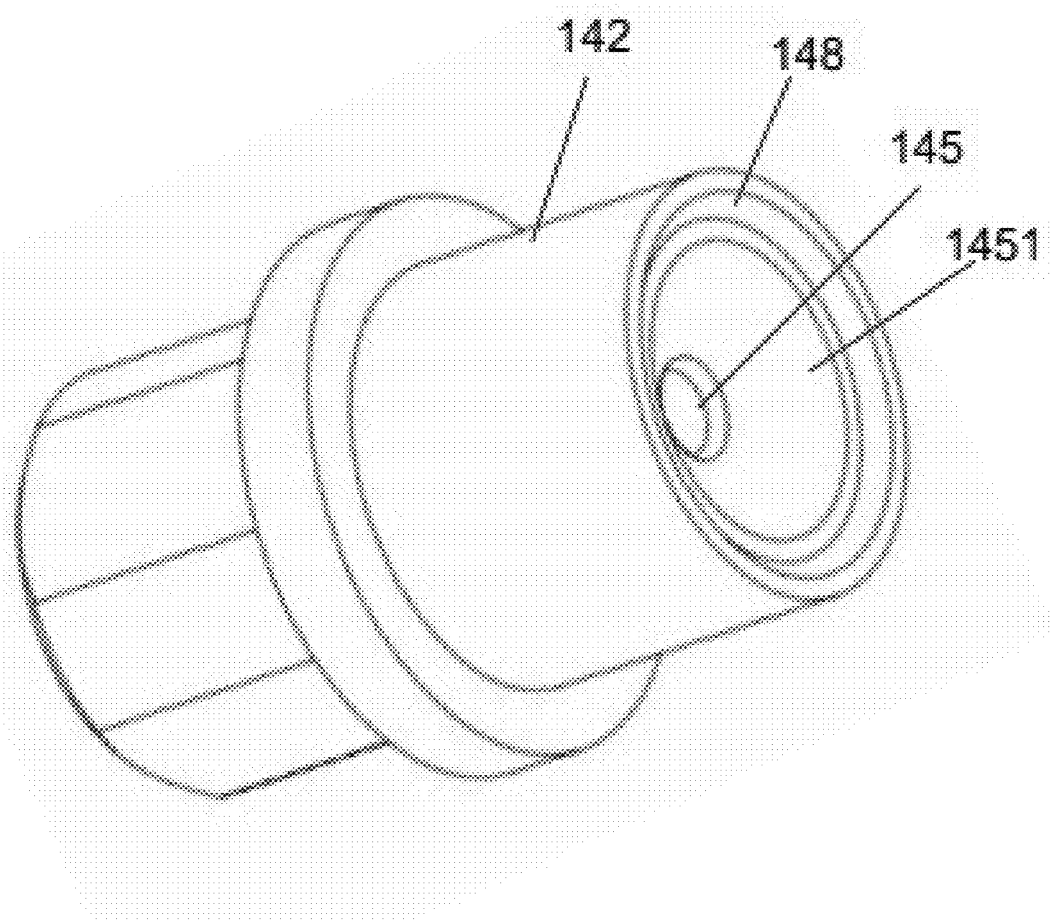
FIG. 10 is a structural schematic diagram of the first tightly-fitting head according to the present disclosure.
Figure 11:
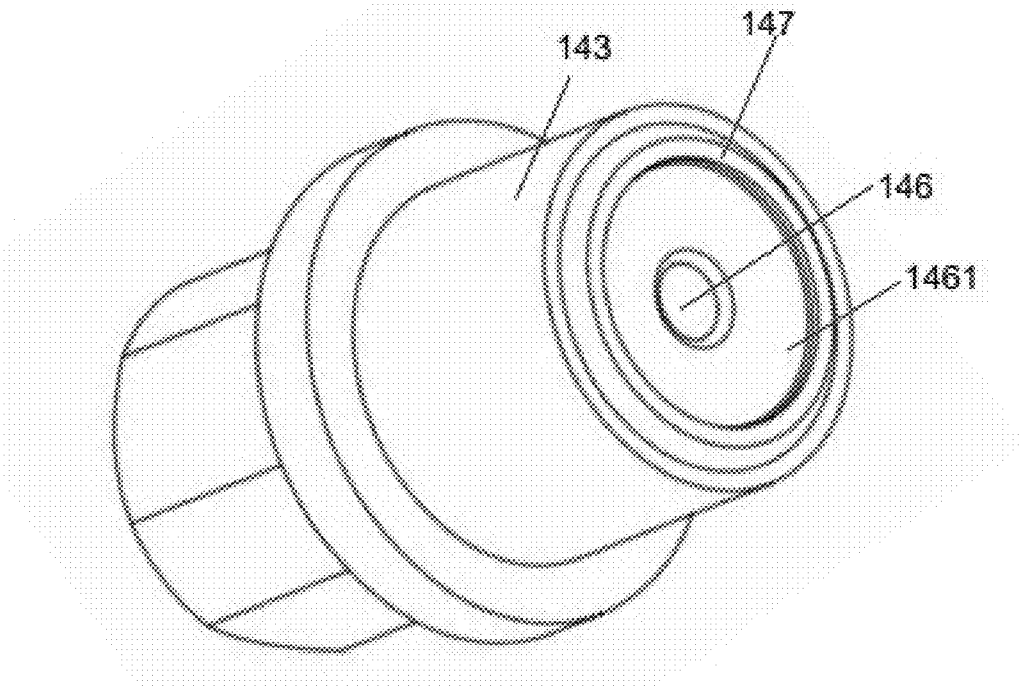
FIG. 11 is a structural schematic diagram of the second tightly-fitting head according to the present disclosure.

As jointly shown in FIGS. 9-11, a first flow passage 145 is set inside the first tightly-fitting head 142, and a first cavity 1451 communicating with the first flow passage 145 is formed at a rear-end of the first flow passage, a second flow passage 146 is set inside the second tightly-fitting head 143, and a second cavity 1461 communicating with the second flow passage 146 is formed at a front-end of the second flow passage. Among them, the first flow passage 145, the first cavity 1451, the second flow passage 146 and the second cavity 1461 are all coaxially arranged, and the openings of the two cavities are same in size, and an elution cavity 147 is formed when the two cavities are close together. In the case of employing this structure, a test card with blood samples is conveyed to the gap between the first tightly-fitting head 142 and the second tightly-fitting head 143, then one elution chamber 147 is formed when the two cavities are close together, in this way a blood sample on the test card just lies inside the elution chamber 147. Subsequently, an eluent flows in from the second flow passage, flows through the elution cavity, and flows out from the first flow passage, so as to avoid necessity in the prior art to punch off dried blood sample spots on a test paper card for dissolution, centrifugation and other steps to make a liquid sample and then perform separation analysis by means of liquid chromatography mass spectrometry, thereby speeding up the test process.

In this example, the volume of the first cavity 1451 is greater than the volume of the second cavity 1461, the first cavity 1451 is conical in shape, and the second cavity 1461 is flat in shape. In the case of employing this structure, since the second cavity is flat in shape and its volume is small, it is possible to quickly fill the second cavity with an eluent, so that the eluent can be fully in contact with the blood sample on the test card; the design that the first cavity is conical in shape and has a larger volume enables a pressure difference to form between itself and the second cavity, facilitating the penetration of the eluent, meanwhile enhancing the fluidity of the fluid passing through the test card, so as to make it easier for the blood sample to detach from the test card.

As shown in FIGS. 9-11, a ring-shaped protuberance 147 is set on a front-end face of the second tightly-fitting head 143. An annular concavity 148 matched with the protuberance 147 is set on a rear-end face of the first tightly-fitting head 142. In the case of employing this structure, it is possible to clamp the test card 9 more tightly and have good occlusion.

Figure 17:
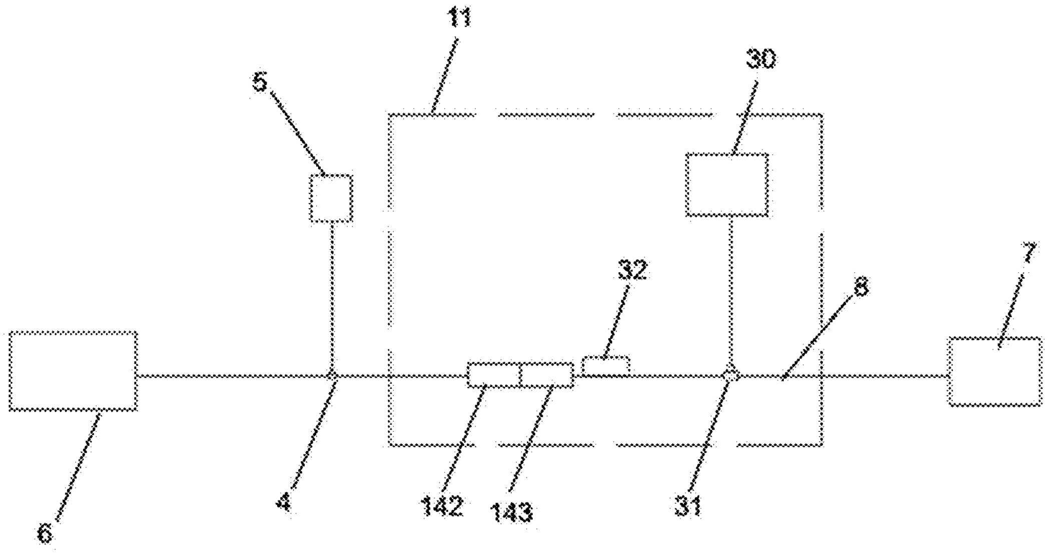
FIG. 17 shows a flow route of the eluent.

As shown in FIG. 17, a drying system 30 and a heating element 32 are installed on a bottom board 171. A conveying pump 7, a test instrument 6 and a collecting bottle 5 are arranged on an outer side of the lower case 11. The conveying pump 7, the drying system 30, the heating element 32, the first tightly-fitting head 142, the second tightly-fitting head 143, the test instrument 6 and the collecting bottle 5 are connected with one another by means of an identical control pipeline 8. In this way, an eluent is pneumatically conveyed by the conveying pump 7, and the eluent enters the elution chamber from the second flow passage, so as to elute a blood sample on the test card 9, and then flows out from the first flow passage; thus the eluent with the blood sample can enter the test instrument 6 to take a test; subsequently, the waste liquid flows into the collecting bottle 5 by the way of controlling the switching of a switching valve 4 connected on the control pipeline 8. A circulation valve 31 is further set on the control pipeline 8, so that a gas circuit or a water circuit is switched by means of the circulation valve 31. A part of the control pipeline located behind the second flow passage is heated by the heating element, so as to heat an eluent flowing through the part, making it easier for the eluent to elute blood samples on the test card. After finishing eluting the blood samples on the test card, a hot wind generated from the drying system 30 blows into the second flow passage 145, passes through the elution chamber 147, then blows out from the first flow passage 146, and enters into the collecting bottle 5 by the way of controlling the switching of the circulation valve 31. The hot wind can blows dry a current test card 9, so as to prevent too much eluent from remaining on the test card, so that the test card can be recycled, and the control pipeline can also be blown dry and the residual eluent therein can be removed.

The fully automatic device used for extracting blood samples from cards according to the present disclosure has been described as above, and its operation process is as follows. During operation, the electric motor rotates to drive the electric rotary table 24 to rotate, conveying a material box 22 taken as the current material box 22 to a lower position of the grabbing mechanism 23; subsequently, the jaw lift assembly 234, the jaw longitudinally-moving assembly 232, the jaw transversely-moving assembly 236 and the jaw-adapted air cylinder 237 move in concert with one another to drive the clamping jaw 238 to clamp the test card 9 with blood samples at the front of the material box 22; at this moment, the clamp 121 lying in a wait at the first stop position is detected by the third sensor 126, which transmits a signal to the controller, and then the controller controls the driving motor 1233 to start, so as to drive the tail of the U-shaped frame 1232 to descend; when the first sensor 124 detects the tail of the U-shaped frame 1232, the tail of the U-shaped frame 1232 lies at a low position, while the front end of the U-shaped frame 1232 lies at a high position after rising, and the driving motor 1233 stops; subsequently, the controller controls the jaw lift assembly 234, the jaw longitudinally-moving assembly 232 and the jaw transversely-moving assembly 236 to move in concert with one another to insert this current test card 9 into the clamp 121 from the outlet 211 via the inlet 111, meanwhile the jaw-adapted air cylinder 237 drives the clamping jaw 238 to release the current test card 9.

Subsequently, the driving motor 1233 drives the tail of the U-shaped frame 1232 to rise slightly, causing the front end of the U-shaped frame 1232 to descend slightly; after that, the detection camera 132 scans the current test card 9; the detection camera 132 transmits a photo having been expressly taken to the controller, after the controller intelligently identifies the position of the blood sample on the test card 9 in the photo, the controller can control the clamp lift assembly 123 and the clamp translating assembly 122 to move in concert with each other, so as to drive the clamp 121 to clamp the current test card 9 and move it to the gap between the first tightly-fitting head 142 and the second tightly-fitting head 143, and the blood sample on the test card 9 is exactly positioned between the first cavity 1451 and the second cavity 1461; subsequently, the tightly-fitting head driving motor 144 drives the second tightly-fitting head 143 to translate toward the first tightly-fitting head 142 until it lies against the first tightly-fitting head 142, and the two cavities are close together to form the elution chamber 147; subsequently, the eluent is pneumatically conveyed by the conveying pump to flow into the second flow passage 146, then flow through the elution chamber 147, next flow out from the first flow passage 145, so as to remove a blood sample from the test card, and the eluent with the blood sample that has flowed out enters the test instrument to take a test, then the switching valve 4 switches to make the waste liquid flow into the collecting bottle 5; after that, the circulation valve 31 controls switching, and the hot wind generated from the drying system blows into the collecting bottle from the second flow passage 146, then passes through the elution chamber 147, next blows out from the first flow passage 145, so as to dry up the current test card 9, as well as the control pipeline, and absolutely remove the residual eluent.

Subsequently, the tightly-fitting head driving motor 144 drives the second tightly-fitting head 143 to return to its initial position, the clamp lift assembly 123 and the clamp translating assembly 122 to move in concert with each other, so as to drive the clamp 121 to clamp the current test card 9 and move the latter to a lower position of the inlet 111. Subsequently, the jaw lift assembly 234, the jaw longitudinally-moving assembly 232, the jaw transversely-moving assembly 236 and the jaw-adapted air cylinder 237 move in concert with one another to drive the clamping jaw 238 to clamp the current test card 9 and put it back into an original isolation groove 221 of the material box 22. Sequentially, the device grabs a next test card 9 with blood samples and repeats the above steps; in this way, it enables the test card 9 with blood samples to be continuously eluted one after another.

To sum up, in the present disclosure, the first flow passage is set inside the first tightly-fitting head, and the first cavity communicating with the first flow passage is formed at a rear-end of the first flow passage, the second flow passage is set inside the second tightly-fitting head, and the second cavity communicating with the second flow passage is formed at a front-end of the second flow passage, and an elution cavity is formed when the two cavities are close together. When a blood sample on the test card just lies inside the elution chamber, an eluent flows in from the second flow passage, flows through the elution cavity, and flows out from the first flow passage, so as to enable the blood sample to quickly detach from the test card, thereby speeding up the elution process and achieving simplicity in structure and cost saving.

We have described in detail an example of the present disclosure as above, but the content described is only a better embodiment of the present disclosure and cannot be considered to be used to pose a limitation on the scope of the present disclosure. All equivalent changes and improvements, and the likes made in accordance with the filling scope of the present disclosure should fall within the protection scope of the present disclosure.

What is claimed is:

1. A fully automatic device used for extracting blood samples from cards comprising an analysis module, a grab module set on said analysis module, an outlet set on a bottom of said grab module, an inlet communicating with said outlet set on the top of said analysis module, and a test card passage formed between said outlet and said inlet; wherein said grab module includes an upper case, a plurality of material boxes used to store a plurality of test cards that are arranged at an inner bottom of said upper case, and a grabbing mechanism used to grab a test card of the plurality of test cards; said analysis module includes a lower case, a holder arranged inside said lower case, the test card conveying mechanism arranged on the holder, a camera with a light source used to detect a position of a blood sample on the test card, an elution mechanism used to elute a blood sample from the test card that has arrived, and a drying system used to dry the test card that has been eluted; said elution mechanism includes a first tightly-fitting head and a second tightly-fitting head that are arranged one in front of another, a gap through which the test card can pass is set between said first tightly-fitting head and said second tightly-fitting head, a tightly-fitting head driving motor that drives said second tightly-fitting head to move toward said first tightly-fitting head is arranged behind said second tightly-fitting head; a first flow passage is set inside said first tightly-fitting head, and a first cavity communicating with said first flow passage is formed at a rear-end of said first flow passage, a second flow passage is set inside said second tightly-fitting head, and a second cavity communicating with said second flow passage is formed at a front-end of said second flow passage; said first flow passage, said first cavity, said second flow passage and said second cavity are all coaxially arranged, and an opening of the first and second cavities are same in size, and an elution cavity is formed when the first and second cavities are close together; and the volume of said first cavity is greater than the volume of said second cavity, said first cavity is conical in shape, and said second cavity is flat in shape.

2. The fully automatic device used for extracting blood samples from cards according to claim 1, wherein the device further includes a heating element installed inside said lower case, said drying system, said heating element, said first tightly-fitting head and said second tightly-fitting head are connected with one another by means of an identical control pipeline, and a circulation valve used to control switching is further connected on said control pipeline.

3. The fully automatic device used for extracting blood samples from cards according to claim 1, wherein an electric rotary table is arranged at the inner bottom of said upper case, said plurality of material boxes are distributed on said electric rotary table at equal intervals, and said grabbing mechanism includes a clamping jaw, a jaw lift assembly that drives said clamping jaw to move upward and downward, a jaw longitudinally-moving assembly that drives said clamping jaw to longitudinally move, and a jaw transversely-moving assembly that drives said clamping jaw to transversely move.

4. The fully automatic device used for extracting blood samples from cards according to claim 1, wherein said test card conveying mechanism includes a clamp positioned below said inlet, a clamp translating assembly that drives said clamp to transversely translate and a clamp lift assembly that drives said clamp to move upward and downward.

5. The fully automatic device used for extracting blood samples from cards according to claim 4, wherein said clamp lift assembly includes a U-shaped frame the middle of which is hinged on said holder and a driving motor positioned at the rear of said U-shaped frame and used to drive a tail of said U-shaped frame to move upward and downward.

6. The fully automatic device used for extracting blood samples from cards according to claim 4, wherein said clamp translating assembly includes a support seat fixed on a front end of a U-shaped frame, a motor fixed on said support seat, and two belt pulleys that are fixed at both ends of said support seat, and around which a belt is twisted, one of said belt pulleys is connected with said motor by means of a rotating shaft, said clamp is fixedly connected with said belt, a plurality of guide wheels are arranged on said support seat, said belt is winded through all of the plurality of guide wheels in turn, said clamp is positioned at the front end of the U-shaped frame and fixedly connected with said belt, a transverse guide rail is fixed before said belt on said support seat, a transverse sliding piece is slidingly connected on said transverse guide rail, and said clamp is fixed on said transverse sliding piece.

7. The fully automatic device used for extracting blood samples from cards according to claim 1, wherein said elution mechanism further includes an elution support, said first tightly-fitting head is installed on said elution support by means of a first connector, and said second tightly-fitting head is installed on said elution support by means of a second connector.

8. The fully automatic device used for extracting blood samples from cards according to claim 7, wherein said first connector includes a first fixing piece and a first clamping piece, said first fixing piece is fixed on a bottom surface of said elution support, a transverse dead groove is set on a bottom surface of said first fixing piece, said first clamping piece is installed inside said transverse dead groove, a first clamping hole is set on said first clamping piece, and said first tightly-fitting head is installed inside said first clamping hole.

9. The fully automatic device used for extracting blood samples from cards according to claim 7, wherein said second connector includes a second fixing piece and a second clamping piece, said second fixing piece is fixed on a bottom surface of said elution support and positioned behind said first fixing piece, a longitudinal sliding groove is set on a bottom surface of said second fixing piece, said second clamping piece is slidably arranged inside said sliding groove, a second clamping hole is set on said second clamping piece, and said second tightly-fitting head is installed inside said second clamping hole.

* * * * *